United States Patent
Drozd et al.

(10) Patent No.: US 9,442,808 B1
(45) Date of Patent: Sep. 13, 2016

(54) SESSION TICKETS FOR A BACKUP AND RECOVERY SYSTEM

(71) Applicant: EMC Corporation, Hopkinton, MA (US)

(72) Inventors: Michal J Drozd, Cracow (PL);
Michael G Roche, Hamilton (CA);
Aliaksandr Shtop, Oakville (CA)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/586,227

(22) Filed: Dec. 30, 2014

(51) Int. Cl.
*H04L 29/06* (2006.01)
*G06F 11/14* (2006.01)
*H04L 9/32* (2006.01)

(52) U.S. Cl.
CPC ......... *G06F 11/1464* (2013.01); *H04L 9/3213* (2013.01); *H04L 63/10* (2013.01)

(58) Field of Classification Search
None
See application file for complete search history.

(56) References Cited

U.S. PATENT DOCUMENTS

| | | | | | |
|---|---|---|---|---|---|
| 5,455,953 | A * | 10/1995 | Russell | ................ | G06F 21/33 710/266 |
| 5,495,533 | A * | 2/1996 | Linehan | ................ | G06F 21/31 380/277 |
| 6,026,414 | A * | 2/2000 | Anglin | ................ | G06F 11/1456 |
| 6,260,069 | B1 * | 7/2001 | Anglin | ................ | G06F 11/1464 707/999.202 |
| 7,313,816 | B2 * | 12/2007 | Sinha | ................ | H04L 63/0428 713/168 |
| 7,480,935 | B2 * | 1/2009 | Bazot | ................ | G06F 21/31 713/185 |
| 7,707,642 | B1 * | 4/2010 | Herbach | ................ | G06F 21/60 726/27 |
| 8,255,984 | B1 * | 8/2012 | Ghostine | ................ | G06F 21/41 709/217 |
| 8,412,934 | B2 * | 4/2013 | De Atley | ................ | G06F 11/1458 713/165 |
| 8,930,808 | B2 * | 1/2015 | Jaquinta | ................ | G06F 17/2264 707/602 |
| 2003/0028592 | A1 * | 2/2003 | Ooho | ................ | G06F 11/1469 709/203 |
| 2004/0225898 | A1 * | 11/2004 | Frost | ................ | H04L 12/2856 726/8 |
| 2006/0229896 | A1 * | 10/2006 | Rosen | ................ | G06Q 10/1053 705/321 |
| 2007/0226488 | A1 * | 9/2007 | Lin | ................ | G06F 21/6209 713/156 |
| 2010/0257578 | A1 * | 10/2010 | Shukla | ................ | G06F 21/6218 726/1 |
| 2010/0274910 | A1 * | 10/2010 | Ghanaie-Sichanie | . | H04L 9/3234 709/229 |
| 2011/0066847 | A1 * | 3/2011 | Christensen | ............ | H04L 9/006 713/156 |
| 2011/0246765 | A1 * | 10/2011 | Schibuk | ............. | H04L 63/0428 713/158 |
| 2014/0289507 | A1 * | 9/2014 | Sitrick | .................. | H04L 9/0861 713/150 |
| 2014/0373126 | A1 * | 12/2014 | Hussain | ................. | H04L 63/08 726/9 |
| 2015/0081376 | A1 * | 3/2015 | Cardone | ............ | G06Q 10/0633 705/7.27 |
| 2015/0341346 | A1 * | 11/2015 | Novak | ................ | H04L 63/0853 726/9 |

OTHER PUBLICATIONS

Wang et al, "SEDBRS: A Secure and Efficient Desktop Backup and Recovery System", 2007, IEEE, First International Symposium on Data, Privacy, and E-Commerce, p. 304-309.*

(Continued)

*Primary Examiner* — Christopher Revak
(74) *Attorney, Agent, or Firm* — John Gould; Theodore A. Chen; Krishnendu Gupta

(57) ABSTRACT

A ticket request is transmitted from an execution engine to an authentication engine. In response, a ticket comprising privileges is received from the authentication engine. The ticket is transmitted to a client, and a service request including the ticket is received back from the client. A service is executed in response to the ticket received from the client and results are transmitted to the client.

15 Claims, 3 Drawing Sheets

(56) References Cited

OTHER PUBLICATIONS

Itani et al, "SECERN: A Secure Enterprise Backup and Recovery System for Mission-Critical Relational Database Servers", 2006, IEEE, p. 1-5.*

Duo et al, "TPM Based Key Backup and Recovery", Aug. 2007, IEEE, Proceedings of the Sixth International Conference on Machine Learning and Cybernetics, p. 2164-2167.*

Ueno et al, "Disaster Recovery Mechanism using Widely Distributed Networking and Secure Metadata Handling Technology", Jun. 9, 2009, ACM, Upgrade-CN'09, p. 45-48.*

* cited by examiner

SESSION TICKETS FOR A BACKUP AND RECOVERY SYSTEM

FIELD OF THE INVENTION

This invention relates generally to client/server authentication, and more particularly to systems and methods for providing access to a service using encrypted tickets.

BACKGROUND OF THE INVENTION

Clients and servers commonly interact with each other to execute automated workflow processes. These processes could be, for example, backup and recovery operations. Data security requires a client be properly authenticated with a server before it is granted access to server resources. Traditional authentication mechanisms, such as username/passwords, may not be conducive to automated workflow processes.

There is a need, therefore, for an improved method, article of manufacture, and apparatus for client/server authentication.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
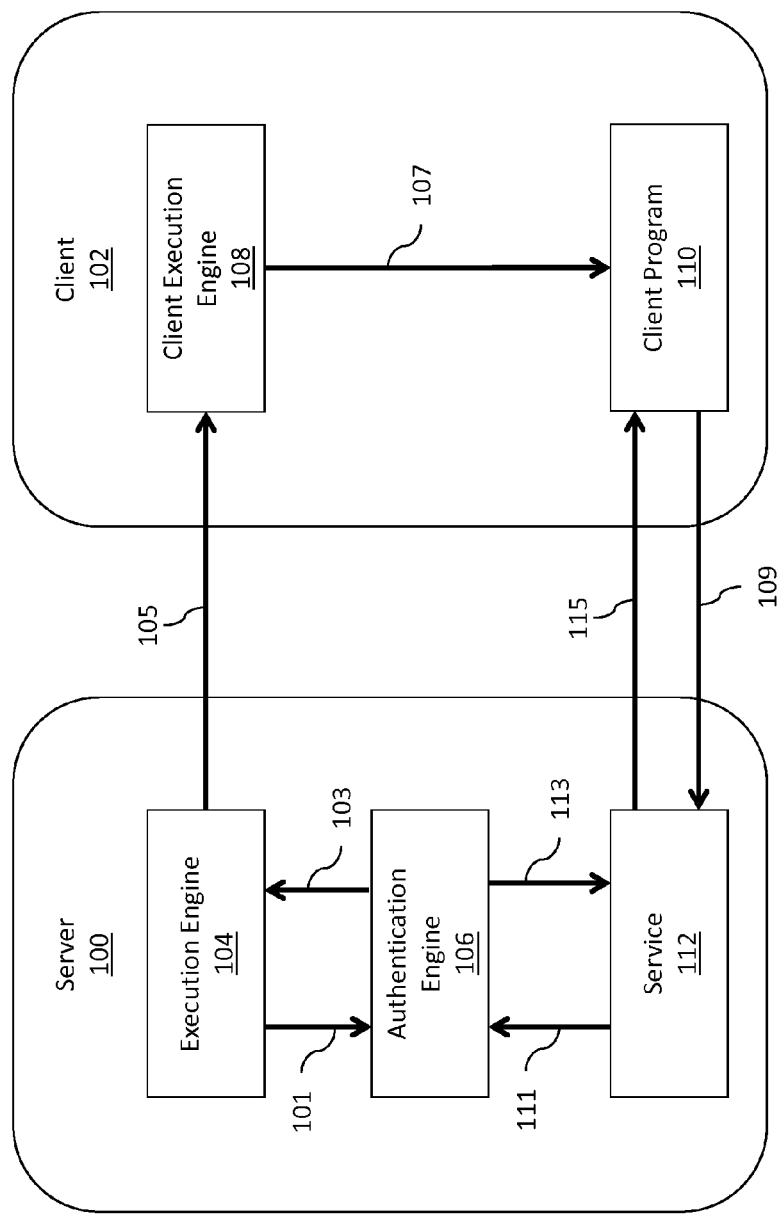
FIG. 1 depicts a system consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems and methods for granting client access to remote services while executing automated workflows, without requiring the system to store user credentials. In some embodiments, the server may generate an encrypted ticket containing the privileges a client needs to access certain resources. The ticket may be transmitted to the client, which may encode the ticket with additional attributes before sending it back to the server. Once the ticket is received from the client, the server may evaluate the privileges encrypted in the ticket to determine if the client has permission to access the requested resources. If the client does have permission, the server may grant access to the resource and/or transmit them back to the client. In an embodiment, this process may be used with legacy systems and ensure backwards compatibility.

FIG. 1 depicts a system consistent with an embodiment of this disclosure. The system may include server 100 and client 102. In some embodiments, server 100 may be a backup server and client 102 may be a general-purpose computer executing a backup and/or restore operation. For example, server 100 may be a Networker® server in communication with a backup storage system.

In some embodiments, client 102 may request resources from server 100 as part of a workflow process, and/or server 100 may initiate a new workflow. For example, server 100 and/or client 102 may have regularly scheduled backup workflows. Once a backup event is encountered, client 102 may request resources to perform the backup from server 100. Additionally or alternatively, server 100 may maintain the backup schedule for each of the clients it manages and may initiate the backup process.

When client 102 needs resources to execute a given workflow, execution engine 104 residing on server 100 may request a ticket from authorization engine 106 at communication 101. In an embodiment, execution engine 104 is a server process that manages workflows and is aware of the resources required for their execution. Authorization engine 106 may also execute on server 100, and in an embodiment grants permissions to access the requested resources. Additionally or alternatively, Authorization engine 106 may execute on a separate server and/or general-purpose machine. After receiving the request, authorization engine 106 may encrypt the permissions into a ticket, along with a time-to-live ("TTL"), server hostname, client identifier, and/or other resource control attributes. Once the ticket is encrypted it may be transmitted back to execution engine at 103.

Once execution engine 104 has received the ticket from authorization engine 106, it may transmit the ticket to client execution engine 108 operating on client 102. Client execution engine 108 may manage the workflow processes from a client perspective, and/or may monitor their execution. In an embodiment, client execution engine 108 may have sent a request to execution 104 for certain resources, and the ticket may be received in response. Additionally or alternatively, execution engine 104 may transmit the ticket to client execution engine 108 as part of a workflow initiated by execution engine 104.

Client execution engine 108 may next communicate the ticket to client program 110. In an embodiment, client program 110 is a binary for executing a certain task. For example, client program 110 may be a backup and/or recovery program, and client execution engine 108 may instruct client program 110 to execute a backup operation. In some embodiments, the ticket may be transmitted to client program 110 along with the execution instructions at 107. Additionally or alternatively, client execution engine 108 may transmit an execution instruction to client program 110, receive a ticket request from client program 110, and then provide the ticket to client program 110. In some embodiments, client execution engine 108 may transmit an execution instruction to client program 110 before receiving a ticket from server 100. Client program 110 may then request a ticket from client execution engine 108, which may in turn request a ticket from server 100. Once the ticket is received it may be communicated to client program 110.

Client program 110 may generate a service request for resources on server 100, and may transmit the service request to backup server 100 at 109. In some embodiments, the service request may include the ticket. The ticket may be encoded into the service request as a string attribute prior to transmitting the service request to server 100. Encoding the ticket as a string attribute may help preserve backwards compatibility. In some embodiments, the requested resources may be on a legacy server other than server 100. That legacy server may not include authentication engine 106, and/or may otherwise be unable to decrypt the ticket. Including the ticket as an attribute in the service request allows the legacy system to disregard it and respond to the request as the legacy system is designed. If, however, the service request is received by an updated system including authentication engine 106, the updated system may read the ticket and grant access to the resources as discussed below.

Server 100 may receive the service request at service 112 via communication 109. Service 112 may then communicate the ticket to authentication engine 106 at 111 for permission to access the requested resources. Additionally or alternatively, authentication engine 106 and service 112 may be the same component and the communication may not be necessary. Authentication engine 106 may then decrypt the ticket to determine if it contains the permissions for the requested resources. The authentication engine may then check the encrypted permissions to determine whether the client is authorized to access the requested resources. Additionally or alternatively, authentication engine may check to see if the TTL in the ticket has expired. If the TTL has expired, authentication engine 106 may reject the request and require client 102 to obtain a new ticket. This may prevent clients from using the same ticket for multiple requests. Authentication engine 106 may further check a client hostname, IP address, MAC address, or other identifier contained in the ticket against a similar identifier received from the client. If the identifiers do not match, the client may be attempting to use a ticket generated for a different client, and the request may be denied. In some embodiments, this check may be implemented using the Generic Security Services ("GSS") protocol.

If the ticket contains the requisite permissions, TTL, and/or host identifier, authorization to access the resource may be communicated from authentication engine 106 to service 112 at 113. Service 112 may then provide those resources to client program 110 at 115. In some embodiments, the resources may be operations, such as backup and/or recovery operations. Additionally or alternatively, they may be data objects and/or files, such as stored backup files. In an embodiment, the resources may be physical resources, such as compute, storage, or bandwidth resources. Any type of resource is consistent with the present disclosure.

Figure 2:
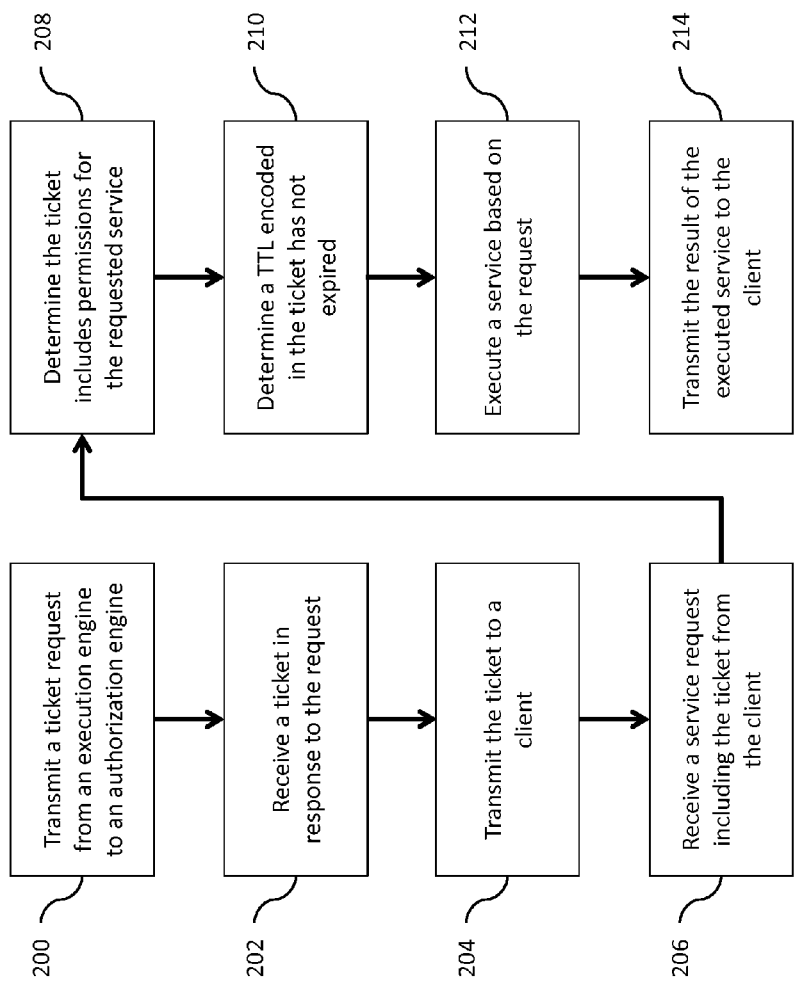
FIG. 2 depicts a process consistent with an embodiment of the present disclosure.

Turning now to FIG. 2, a flowchart consistent with an embodiment of this disclosure is discussed. At 200, a ticket request may be transmitted from an execution engine to an authentication engine. In an embodiment, these engines may be substantially similar to execution engine 104 and authorization engine 106 discussed in reference to FIG. 1.

At 202, a ticket may be received in response to the request. This ticket may be received from the authorization engine at the execution engine. In some embodiments, the ticket contains encrypted privileges for and backup and/or recovery process. The ticket may further include an encrypted TTL and client identifier, as discussed above.

At 204, the ticket may be transmitted to a client. This client could be, for example, substantially similar to client 102. Client 102 may internally process the ticket, as discussed in reference to FIG. 1, and the ticket may be received back from the client at 206. In some embodiments, the ticket is received as an attribute in a service request. This may assist in maintaining backwards compatibility with legacy systems.

At 208, a check may be made to determine if the ticket includes the necessary permissions to access the requested service. If the ticket does not include the necessary permissions, the request may be denied. If the ticket does include the necessary permissions, access to the service and/or resources embodied by the service may be provided to client 100.

At 210, an additional check may determine whether the TTL encoded in the ticket has expired. If the TTL has expired, the request may be denied. If the TTL has not expired, access to the service and/or resources may be granted.

At 212, a service may be executed based on the request. This service could include, for example, granting access to certain resources, such as backup and/or recovery resources. Additionally or alternatively, the service may be an operation, such as a backup and/or recovery operation.

Finally, at block 214 the results of the executed service may be transmitted to the client. If the service grants access to a resource, that resource may be transmitted to a client. If the service is an operation, the status and or results of the operation may be communicated. For example, if the service is a backup operation a "success" status may be transmitted to the client when a provided backup is successfully stored on a computer readable storage medium.

Figure 3:
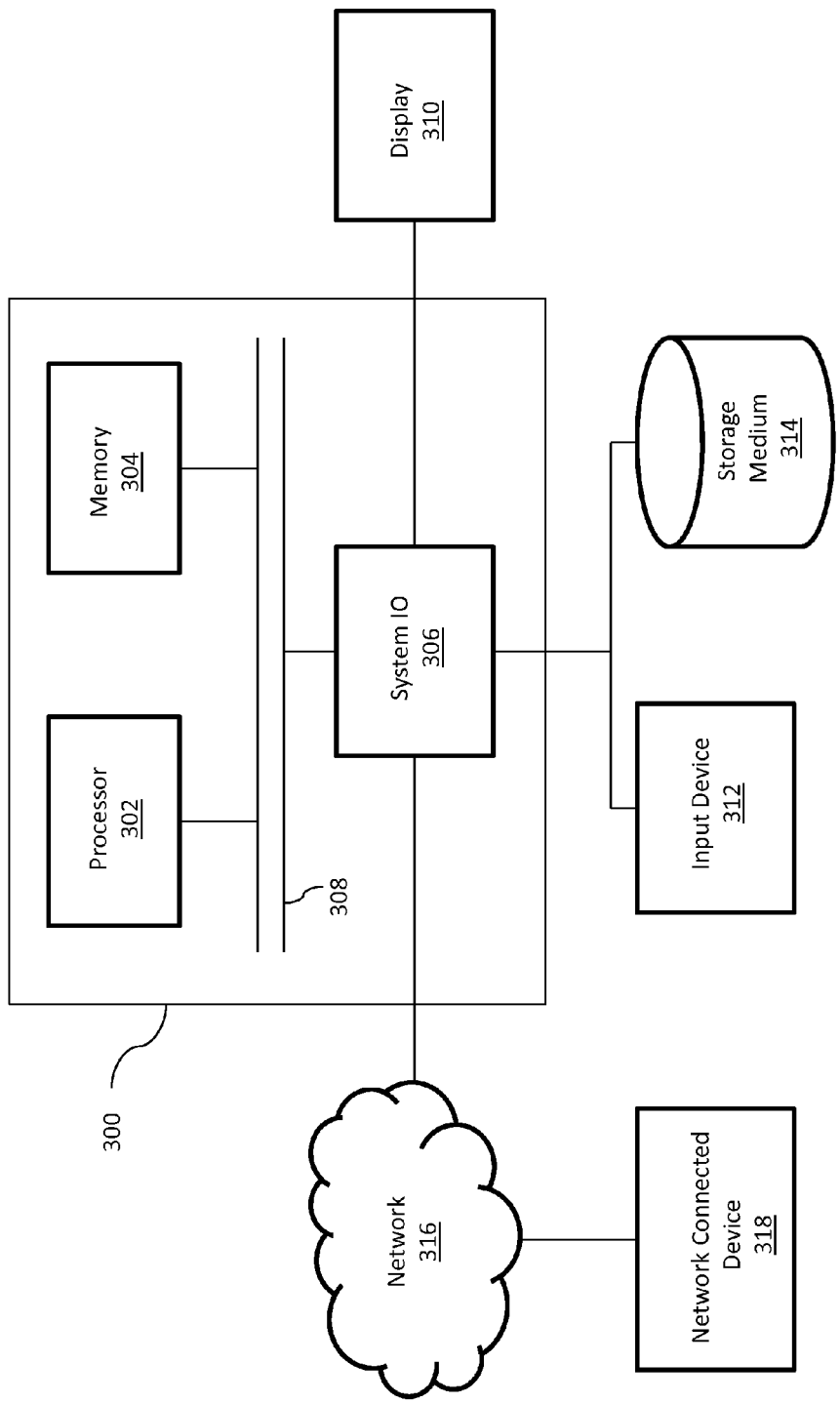
FIG. 3 depicts a general purpose computer system consistent with an embodiment of the present disclosure.

FIG. 3 depicts a computer system which may be used to implement different embodiments discussed herein. General purpose computer 300 may include processor 302, memory 304, and system IO controller 306, all of which may be in communication over system bus 308. In an embodiment, processor 302 may be a central processing unit ("CPU") or accelerated processing unit ("APU"). Some embodiments may comprise multiple processors, or a processor with multiple cores. Processor 302 and memory 304 may together execute a computer process, such as the processes described herein.

System IO controller 306 may be in communication with display 310, input device 312, non-transitory computer readable storage medium 314, and/or network 316. Display 310 may be any computer display, such as a monitor, a smart phone screen, or wearable electronics and/or it may be an input device such as a touch screen. Input device 312 may be a keyboard, mouse, track-pad, camera, microphone, or the like, and storage medium 314 may comprise a hard drive, flash drive, solid state drive, magnetic tape, magnetic disk, optical disk, or any other computer readable and/or writable medium. Storage device 314 may also reside inside general purpose computer 300, rather than outside as shown in FIG. 3.

Network 316 may be any computer network, such as a local area network ("LAN"), wide area network ("WAN") such as the internet, a corporate intranet, a metropolitan area network ("MAN"), a storage area network ("SAN"), a cellular network, a personal area network ("PAN"), or any combination thereof. Further, network 316 may be either wired or wireless or any combination thereof, and may provide input to or receive output from IO controller 306. In an embodiment, network 316 may be in communication with one or more network connected devices 318, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for authorizing a client to access a service, the method comprising:
   transmitting a ticket request from an execution engine executing remotely from a client to to an authorization engine;
   receiving a ticket in response to the request, wherein the ticket comprises encrypted privileges for executing at least one of a backup process and a recovery process;
   transmitting the ticket to the client;
   receiving a service request at a server from the client, wherein the service request includes the ticket;
   determining whether the server is a legacy server;
   disregarding the ticket when the server is the legacy server;
   executing a service requested by the service request; and
   transmitting a result of the executed service to the client.

2. The method of claim 1, wherein the ticket comprises an encrypted time-to-live ("TTL").

3. The method of claim 2, further comprises determining the TTL has not expired prior to executing the service.

4. The method of claim 1, further comprising the ticket grants permission to execute the service prior to executing the service.

5. The method of claim 1, wherein the authorization engine is executing on the server.

6. A computer program product for authorizing a client to access a service, the computer program product comprising a non-transitory computer readable medium encoded with computer executable program, the code enabling:
   transmitting a ticket request from an execution engine executing remotely from a client to an authorization engine;
   receiving a ticket in response to the request, wherein the ticket comprises encrypted privileges for executing at least one of a backup process and a recovery process;
   transmitting the ticket to the client;
   receiving a service request at a server from the client, wherein the service request includes the ticket;
   determining whether the server is a legacy server;
   disregarding the ticket when the server is the legacy server;
   executing a service requested by the service request; and
   transmitting a result of the executed service to the client.

7. The computer program product of claim 6, wherein the ticket comprises an encrypted time-to-live ("TTL").

8. The computer program product of claim 7, further comprises determining the TTL has not expired prior to executing the service.

9. The computer program product of claim 6, further comprising the ticket grants permission to execute the service prior to executing the service.

10. The computer program product of claim 6, wherein the authorization engine is executing on the server.

11. A system for authorizing a client to access a service, comprising a non-transitory computer readable storage medium and a processor executing instructions for:
    transmitting a ticket request from an execution engine executing remotely from a client to an authorization engine;
    receiving a ticket in response to the request, wherein the ticket comprises encrypted privileges for executing at least one of a backup process and a recovery process;
    transmitting the ticket to the client;
    receiving a service request at a server from the client, wherein the service request includes the ticket;
    determining whether the server is a legacy server;
    disregarding the ticket when the server is the legacy server;
    executing a service requested by the service request; and
    transmitting a result of the executed service to the client.

12. The computer program product of claim 11, wherein the ticket comprises an encrypted time-to-live ("TTL").

13. The computer program product of claim 12, further comprises determining the TTL has not expired prior to executing the service.

14. The computer program product of claim 11, further comprising the ticket grants permission to execute the service prior to executing the service.

15. The computer program product of claim 11, wherein the authorization engine is executing on the server.

* * * * *